May 10, 1938.  E. H. WELLS, JR  2,116,746
GASKET
Filed March 20, 1936
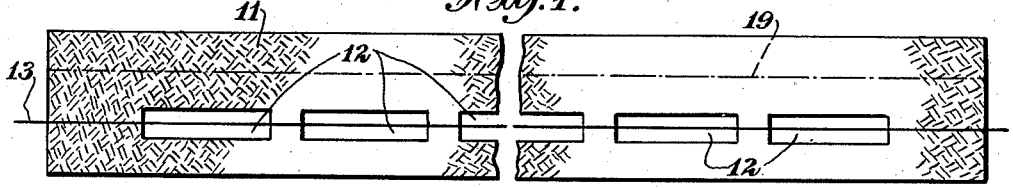
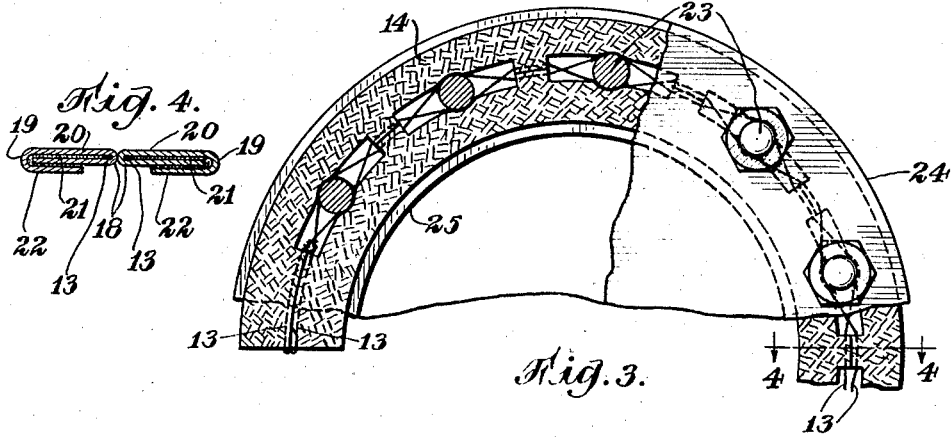
INVENTOR
EDWARD H. WELLS, JR.
BY D. N. Halstead.
ATTORNEY Patented May 10, 1938

2,116,746

UNITED STATES PATENT OFFICE 2,116,746

GASKET

Edward H. Wells, Jr., New York, N. Y., assignor to Johns-Manville Corporation, New York, N. Y., a corporation of New York Application March 20, 1936, Serial No. 69,749

4 Claims. (Cl. 288—1)

This invention relates to a packing and the method of making the same, particularly to a gasket adapted to pack the space between two members held together by bolts or other fasteners.

The invention comprises the herein described novel features of the article of manufacture and the method of making it. Thus, the invention comprises a coherent packing element and a wire engaging the element at spaced positions and adapted at intervening positions to be looped behind the fasteners securing together members defining therebetween the space to be packed. The invention comprises also such a gasket in which the wire at certain positions is slidable lengthwise with respect to the packing element, and the method of making the gasket.

The invention is illustrated in the attached drawing and will be described, for the purpose of exemplification, in connection therewith.

Fig. 1 shows a face view of a preferred type of gasket in an intermediate stage of manufacture.

Fig. 2 shows a face view, in finished form, of the assembly of Fig. 1.

Fig. 3 shows a plan view, partly broken away for clearness of illustration, of an assembly gasketed in accordance with the present invention with a pair of the units shown in Fig. 2.

Fig. 4 shows a sectional view on line 4—4 of Fig. 3.

In making the improved gasket, there is first formed a packing element of coherent, resiliently compressible material. A wire is then caused to engage the said element at spaced positions, the wire preferably forming between the said positions, loops, of moderate length each, adapted to be engaged behind bolts or other fasteners.

Thus, in making the gasket shown in Figs. 1-4, there is first formed a band 11, as, for instance, a woven asbestos listing, although canvas, or the like, may be used in place of asbestos if the heat-resistant properties of the latter are not desired.

The band is provided with cut-outs 12 extending in spaced relationship to each other lengthwise of the inner portion of the band. The cut-outs constitute slots surrounded individually by portions of the coherent fabric.

A wire 13 is disposed lengthwise over the band, suitably over about the midportions of the cut-outs.

The band is then folded on a line extending lengthwise of the band and across the cut-outs, say, on a line underlying the wire 13, as an axis, to give the product shown in Fig. 2 in plan view and illustrated in section in Fig. 4, the latter view showing a pair of the gasket elements in assembled relation. In this folded product, the portions of the band originally at either side of the cut-outs form a thickened band 14 constituting the packing element proper, whereas the portions of the band originally between the ends of adjacent cut-outs form the tabs or projections 15, inside which the wire 13 is engaged. The portion 4 includes three plies as best shown in Fig. 4, the outer ply 22 being formed by folding the fabric 11 forward along the dotted line 19.

Suitably the wire 13 is in slack condition, so that there is a greater length of wire, for instance, between the end portions 16 and 17, at which the wire is firmly secured to the gasket, than the length of the gasket itself between those two positions. This slackness of the wire facilitates curving the packing element, as illustrated in Fig. 3, with the wire extending outside the packing element.

Suitably, the fold portions 20 and 22 are secured together. Thus, a binder indicated at 21 may be applied over the faces that, in the finished article, are to be in contact with each other as well as over the exterior surfaces also of the band. I have used as binder a rubber cement, the rubber being largely at least in unvulcanized condition in the finished product. Other yieldable binders that are conventional in packing articles may be used, as, for instance, polymerized chloroprene of rubbery consistency or plastic olefin polysulphide compositions.

The several layers in the packing element are suitably adhered together by the binder under compression, into a unitary article.

I may omit the adhesive (binder) between portions of the folded article constituting the tabs or projections 15, this omission making the engagement of the wire, within those tabs or projections, readily slidable in lengthwise relationship to the gasket, except at the end portions 16 and 17 of the gasket.

It will be noted that the fastener, such as the bolt 23 secures together the members 24 and 25 defining therebetween the space to be gasketed. Thus, the plates at the front end of a locomotive boiler may be assembled with a pair of my improved gaskets as shown in Figs. 3 and 4.

The wire engages the packing element at spaced positions as illustrated, for instance, in Fig. 2, and, at intervening positions, is looped behind the fasteners 23 as shown in Fig. 3. In other words, the fasteners are disposed between the element 14 and the wire 13.

Since the wire is so readily flexible, it may be engaged behind bolts, or the like, with a minimum of distortion of the element 14 upon which the true closing of the space to be packed depends. Also, the smallness of area of cross section of the wire makes possible the concentration of the pressure of the gasketed members upon the packing element proper.

The wire 13 may be constituted of copper, brass, or other strong metal or alloy that is flexible in wire form and may be associated with asbestos fibres, as in wire-reenforced asbestos yarn.

The gasket shown may be impregnated in its fibrous portion with suitable lubricating or packing compositions and may be coated exteriorly with lubricants, such as graphite, grease, or the like.

The term wire is meant to include an elongated metal member of small area of cross section. This member may be round or it may be in the form of a ribbon, such as a narrow metal tape.

It is to be understood that the details given are for the purpose of illustration, not restriction. It is intended, therefore, that variations within the spirit of the invention are to be included in the scope of the appended claims.

What I claim is:

1. A gasket adapted for use as packing in an assembly including spaced members and fasteners extending therebetween and securing the said members together, the gasket comprising a resiliently compressible packing element and a wire secured to end portions of the said element, slidably engaging the said element at spaced intervening portions, and, at positions between the said intervening portions adapted to be engaged by the said fasteners, to cause the fasteners to extend between the said element and wire.

2. A gasket adapted for use as packing in an assembly including spaced members and fasteners extending therebetween and securing the said members together, the gasket comprising a resiliently compressible packing element and a wire engaging the said element at spaced positions and engaged at intervening positions by the said fasteners, so that the fasteners extend between the said element and wire, and the wire being normally slack and of greater length than the packing element between positions of engagement of the wire therewith, whereby the wire is adapted to be looped behind the said fasteners.

3. An assembly including two members defining therebetween a space to be packed, fasteners extending through the said space and securing the two members together, and a gasket packing the said space, the gasket comprising two elongated packing elements extending on opposite sides of the said fasteners and wires each engaging one of the packing elements at spaced positions and at intervening positions engaged behind the said fasteners, the said wires including two strands wrapped in spaced turns around the said elements, from opposite directions, so that the strands are intercrossed and spaces provided between the cross-over positions for insertion of the gasket over and around the fasteners.

4. A gasket comprising a woven packing element, a wire extending generally parallel to an edge of the element and in spaced relationship thereto and projections from the said element engaging the wire at spaced intervals, so that a space is defined between the said element, wire, and projections.

EDWARD H. WELLS, Jr.